United States Patent Office 2,908,562
Patented Oct. 13, 1959

2,908,562

ACTIVATION OF ALUMINUM

Elmer H. Dobratz, Pittsburgh, Pa., assignor to Koppers Company Inc., a corporation of Delaware No Drawing. Application July 13, 1955
Serial No. 521,901

19 Claims. (Cl. 75—68)

This application is concerned with a method of activating aluminum to be used in the preparation of organic compounds. It is particularly concerned with the method for the activation of aluminum to be used in preparation of alkylaluminums.

Heretofore in order to activate or prepare aluminum for use in reactions such as the preparation of tri-alkyl-aluminums from the aluminum, an alkene-1 and hydrogen, it has been necessary to resort to mechanical treatment such as, for example, milling, for example, in the presence of an alkylaluminum or by spraying molten aluminum into a protective liquid thereby producing a finely divided active material. Additionally, it has been observed that not all forms of aluminum are satisfactory as starting materials to be subjected to the milling or spraying treatments. In those instances wherein a particular aluminum did not satisfactorily respond to such mechanical treatments, it has been customary to discard that aluminum and seek a different source.

Additionally, it has been necessary to protect the surface of the aluminum which has undergone the mechanical treatment to prevent oxidation thereof in order to retain the activity. This has been accomplished for example, by milling in the presence of, for example, a trialkylaluminum.

In a different type of organic reaction, it is known to utilize aluminum to produce hexachloraethane by reaction with carbon tetrachloride. However, ordinary aluminum when utilized in this process has a considerable induction period before the desired reaction takes place. Thus, the aluminum at first is inactive in this organic reaction and it is only after, for example, boiling for approximately one hour in the presence of carbon tetrachloride that it is activated and the desired reaction occurs.

It has now been discovered as a feature of this invention, that it is possible simple and effectively to activate any commercially available aluminum by heating said aluminum to a temperature above about 150° C. in the presence of hydrogen and a compound of the formula $R_2AlY$ in which R is chosen from the class consisting of hydrogen, alkyl and aryl and Y is chosen from the class consisting of alkyl and aryl, such as, for example, an alkylaluminum as more fully hereinafter described. It will be realized that the temperature of treatment conveniently is below the ultimate decomposition temperature of the compound utilized in the treatment of the aluminum.

The present invention comprises a process for the activation of aluminum useful in the preparation of organic compounds, comprising heating inactive aluminum in the presence of hydrogen and a compound of the formula $R_2AlY$ as heretofore described at a temperature of at least about 150° C. and below the ultimate decomposition temperature of said compound.

Further, the present invention contemplates a process for the activation of aluminum useful in the preparation of organic compounds comprising heating inactive aluminum in the presence of hydrogen and a compound $R_2AlY$, as described above, at a temperature above about 150° C. and below the ultimate decomposition temperature of said alkylaluminum for a period of time of at least about ½ hour.

It has been observed that some activation of the aluminum is obtained immediately upon reaching the temperature about 150° C. However, it is desirable and preferred to maintain the temperature at or above about 150° C. for a period of time of about ½ hour or more in order to attain complete activation of the aluminum being treated.

It will be noted that the present invention eliminates the step of utilizing the heretofore required mechanical treatments which are both costly and time-consuming. A further feature of the invention resides in the fact that rather than it being required that a specific grade or type of aluminum such as, for example, grained aluminum, be utilized, there can now be used any commercially available aluminum.

As used herein, the term alkylaluminum is intended to embrace trialkylaluminums and mono- and di-alkylaluminum hydrides. The term "ultimate decomposition temperature" is intended to mean the temperature at which the last remaining carbon-aluminum bond is broken. Thus, for example, while a trialkylaluminum can "decompose" to yield a dialkylaluminum hydride and an alkene, this decomposition is not an "ultimate" decomposition since the dialkylaluminum hydride can "decomposed" further to yield a monoalkylaluminum dihydride and an alkene.

As used herein the terms "parts" and "percent" mean parts and percent by weight unless otherwise specified.

The process of this invention is applicable particularly to the activation of aluminum useful in the preparation of a wide variety of alkylaluminums, such as, for example, tri-isobutylaluminum, triethylaluminum, tripropylaluminum, trioctylaluminum, tridecylaluminum and the like, as well as the mono- and di-alkylaluminum hydrides.

The aluminum to be utilized in the present invention preferably is in the comminuted form such as, for example, a pigment grade aluminum for either paint or varnish. Alternatively, the aluminum can have been comminuted by milling, by drilling or the like. It is to be noted that while these are mechanical operations, it is not necessary when utilizing the present invention that these operations be conducted in such a manner as to protect the surface of the aluminum from, for example, oxidation. Such aluminums, when milled in the absence of a protective atmosphere, are useless in the afore-described organic processes unless they are subjected to a further and additional mechanical treatment in a protective atmosphere. Thus, they must be, for example, milled, allowed to undergo an induction period, or specially prepared by such as being sprayed into a protective atmosphere. However, the present invention provides a new, method of activating the aluminum without resorting to heretofore known procedures.

Broadly, utilizing the present invention, the activation of aluminum is accomplished by placing the inactive aluminum in comminuted form in a suitable reaction vessel, adding thereto an amount of a compound, $R_2AlY$, sufficient to immerse the aluminum, adding thereto hydrogen and thereafter heating the contents of the vessel to a temperature above about 150° C. and below the ultimate decomposition temperature of the particular compound being utilized preferably for a period of at least about ½ hour. It will be realized that rather than utilizing solely a compound to submerge the aluminum there can be utilized a solution or dispersion of said compound in a suitable inert liquid such as, for example, heptane, cyclohexane, benzene and the like. In general, it is desirable that there be present in the system a minimum of about 5–10% of alkylaluminum based on the amount of aluminum being activated. It is to be noted that the present invention finds particular utility in the activation of aluminums for the preparation of trialkylaluminum. These trialkylaluminums are useful per se as catalysts for a variety of polymerization reactions and can be further utilized as the starting point for preparation of other catalysts similarly useful.

For purposes of ease of contacting the "activator," $R_2AlY$, with the inactive aluminum it is preferred that the activator be either liquid at the activation temperature or soluble in an inert organic liquid as heretofore described.

The following examples are illustrative, but not restrictive, of the present invention:

*Example 1*

To a pressure vessel equipped with an agitator there is added 100 parts of aluminum chips (3.7 mols) prepared by drilling an aluminum ingot on an ordinary drill press and 150 parts tri-isobutylaluminum. Hydrogen is added to produce a pressure in the range of 500–800 p.s.i.g. Agitation is commenced and the system is heated to and maintained at 150° C. for a period of approximately 10 hours.

There is then added under pressure 800 parts of iso-butylene (14.3 mols) and hydrogen is added to the system to produce a pressure of approximately 2000 p.s.i.g. Heating and agitation is continued for approximately 20 hours. During this period the pressure in the system is maintained in the range of 1400–1500 p.s.i.g. by the addition of hydrogen as required by the pressure drop in the system. The reaction vessel is cooled to approximately 70° C. and the system vented.

The contents of the reaction vessel are distilled at a pressure of approximately 1/10 millimeter mercury. There is obtained approximately 250 parts tri-isobutylaluminum. Thus, there is an increase of 100 parts tri-isobutylaluminum over that originally present which is obtained from the aluminum which has been activated by the treatment with tri-isobutylaluminum.

It is to be noted that when the temperature of heating is increased the amount of aluminum activated per unit time is increased. For example repetition of Example 1 utilizing similar quantities of aluminum and tri-isobutylaluminum and heating at a temperature of 190° C. for a period of 1–2 hours yields activated aluminum.

Utilization of this activated aluminum in the preparation of tri-isobutylaluminum as described above yields 775 parts tri-isobutylaluminum which represents an increase in amount of tri-isobutylaluminum of 625 parts tri-isobutylaluminum which has been prepared from the aluminum activated by the original step.

*Example 2*

There is added to the reaction vessel of Example 1, 100 parts aluminum drillings and, to immerse the aluminum, a mixture of 200 parts heptane and 10 parts tri-isobutylaluminum. Hydrogen is added to produce a pressure in the range of 500–800 p.s.i.g. The procedure of Example 1 is followed. An increase in the amount of tri-isobutylaluminum attributable to the reaction of activated aluminum substantially similar to that observed in Example 1 is noted.

Similarly, the higher activation temperature of 190° C. illustrated in Example 1 can be utilized in Example 2 to give substantially similar results.

It is to be realized that the amount of alkylaluminum admixed with heptane in the aforegoing example can be varied as desired. In general, as aforementioned, the amount should be at least in the range of about 5–10% based on the aluminum being activated. It will be further realized that in place of the heptane utilized in this example, there can be substituted similar quantities of other inert suspending liquids.

*Example 3*

The procedure of Example 1 is repeated substituting for the aluminum drillings there utilized 100 parts of aluminum flakes having an apparent density of 0.5 gram per ml. and an average size of approximately 10–20 microns, approximately 2–5% of which is retained on a 100 mesh screen and 90% of which goes through a 325 mesh screen. The activation is carried out at 190° C. There obtained results substantially similar to those obtained in Example 1.

Repetition of Example 2 utilizing the aluminum flakes described in this example yields results substantially similar to those observed in Example 2 with the same activation temperature.

*Example 4*

The procedure of Example 1 is repeated substituting for the aluminum drillings there utilized an equal weight of an aluminum powder having an apparent density of approximately 1.2; approximately 2–5% of which is retained on a 100 mesh screen, and 80% of which passes through a 325 mesh screen. The activation at 190° C. for 1–2 hours yields results somewhat inferior to those obtained in Example 1 at a similar activation temperature. However, activation at 235° C. for a similar period of time yields results which are substantially similar to those obtained in Example 1 at an activation temperature of 190° C.

*Example 5*

To the reaction vessel of Example 1 there is added 466 parts tri-isobutylaluminum, 232 parts of flaked aluminum (described in Example 3), and 1,055 parts of iso-butylene (liquid). The vessel is then pressurized with hydrogen to a pressure of 750 p.s.i.g. Agitation is commenced and the temperature of the contents of the reaction vessel raised to 190° C. It is maintained at that temperature for 2 hours during which time the pressure was maintained in the range 1400–1900 p.s.i.g. by the addition of hydrogen as required. The temperature was then lowered to 135° C. and there maintained with agitation for approximately 15 hours.

The system is vented and heated to approximately 70° C. to drive off dissolved gas. There is recovered from the vented gas 532 parts essentially pure iso-butane.

There is added to the reaction vessel 439 parts iso-butylene. The reactants are agitated at 70° C. for approximately ½ hour. The vessel is vented and there is recovered 209 parts essentially pure iso-butylene.

The contents of the reaction vessel are distilled at 1/10 millimeter mercury. There is obtained 1500 parts tri-isobutylaluminum which is an increase of 1034 parts. There is recovered 66 parts aluminum.

*Example 6*

To the reaction vessel of Example 1 there is added 475 parts tri-isobutylaluminum, 425 parts of aluminum powder (described in Example 4), and 1,150 parts liquid iso-butylene. The reaction vessel is pressurized to 750 p.s.i.g. with hydrogen and the temperature raised to 235° C. and there maintained while the contents are agitated for a period of 2 hours. The pressure is maintained during this period by the addition of hydrogen at 400–1900 p.s.i.g.

Thereafter, the temperature is lowered to 135° C. and there maintained with agitation for a period of approximately 10 hours. Again the pressure of the system is maintained in the range of 1400–1900 p.s.i.g. by the addition of hydrogen as required. The contents of the reaction vessel are then cooled to approximately 70° C., the system is vented and there is obtained from the vent gas approximately 300 parts iso-butane.

There is added to the reaction vessel at 70° C. 600 parts iso-butylene and the contents maintained at this temperature with agitation for approximately ½ hour. The reaction vessel is then vented and there is obtained in the vent gas 200 parts iso-butylene. The residual aluminum is separated from the liquid contents of the reaction vessel and the liquid contents distilled at 1/10 millimeter mercury pressure. There is obtained 1,770 parts tri-isobutylaluminum boiling at 33° C. This represents a yield of more than 93% based on aluminum consumed and a yield of approximately 71% based on the iso-butylene.

It will be realized that this example is illustrative of the aforementioned procedure of utilizing the method of this invention for activating aluminum for the preparation of aluminum trialkyls wherein said activation is accomplished in the presence of the reactants utilized in the preparation of said aluminum trialkyl as well as in the presence of the alkylaluminum utilized for the activation procedure.

*Example 7*

To the reaction vessel of Example 1 there is added 590 parts triisobutylaluminum, 600 parts of the aluminum powder described in Example 4, 315 parts of iso-butylene and hydrogen sufficient to attain a pressure in the system of 500 p.s.i.g. The contents of the vessel are then agitated and heated to a temperature in the range 233–241° C. for a period of approximately 1 hour while the pressure is maintained in the range 600–1000 p.s.i.g. by the addition of hydrogen as required.

The contents of the reaction vessel are cooled to 70° C. The vessel is vented and there is recovered 347 grams iso-butane. There is added to the reaction vessel 1255 parts iso-butylene and hydrogen sufficient to raise the pressure of the system to 750 p.s.i.g. The contents of the vessel are agitated and maintained at a temperature of approximately 135° C. for about 13 hours during which time the pressure is maintained at 1250–1950 p.s.i.g. by the addition of hydrogen as required. The contents of the vessel are then cooled to 70° C. and the vessel vented. There is recovered 110 parts iso-butane. There is added to the reaction vessel 655 parts iso-butylene and the contents stirred at 70° C. for approximately ½ hour. Upon venting, there is recovered 230 parts iso-butylene. The aluminum is separated from the liquid contents. Upon distillation of the liquid at 1/10 millimeter mercury there is obtained 2545 parts of tri-isobutylaluminum boiling at 33° C. This represents an increase of 1955 parts of tri-isobutylaluminum over the amount originally charged and utilized in the activation of the aluminum. This represents a yield of 83% based on the iso-butylene and 95% based on the aluminum utilized.

Comparison of the results of Examples 6 and 7 illustrates the desirability of utilizing small quantities of iso-butylene during the activation stage. Thus the overall yield based on iso-butylene in Example 6 wherein 1150 parts iso-butylene are utilized when activating 475 parts alumina is 71%; in Example 7 wherein 315 parts iso-butylene are utilized while activating 590 parts aluminum is 83%.

*Example 8*

To a suitable reaction vessel there is charged 600 parts tri-isobutylaluminum, 500 parts of aluminum drillings as described in Example 1, and the contents heated at 200° C. for a period of approximately 2 hours. The contents are cooled to approximately room temperature and the aluminum separated from the liquid contents of the reaction vessel under a protective atmosphere of nitrogen. The activated chips are washed free of tri-isobutylaluminum with heptane in an inert atmosphere. The chips are slurried in heptane and there is added slowly 10,000 parts carbon tetrachloride while the temperature is maintained at approximately 77° C., the boiling point of carbon tetrachloride.

Upon the completion of the addition of the carbon tetrachloride the contents are distilled and there is obtained approximately 5,000 parts hexachloraethane.

While the foregoing examples are concerned principally with tri-isobutylaluminum as an activating agent it is to be noted that an "activator" as described broadly heretofore can be substituted in the foregoing examples for the tri-isobutylaluminum there used to yield substantially similar results. Thus, for example, such activators as triethylaluminum, tripropylaluminum, tripentylaluminum, trihexylaluminum, triheptylaluminum, tridecylaluminum, diethylaluminum hydride, dipropylaluminum hydride, dioctylaluminum hydride, didecylaluminum hydride, as well as monoethylaluminum hydride, monopropylaluminum hydride, monopentylaluminum hydride, mono-octylaluminum hydride, monodecylaluminum hydride, and the like can be utilized. Similarly, such arylaluminums as for example triphenylaluminum and trinaphthylaluminum can be utilized. It is to be remembered that these alkylaluminums are utilized at temperatures below their ultimate decomposition temperatures.

In those instances in which powdered or flaked aluminum is utilized, that is, aluminum particles at least approximately 75% of which passes through a 325 mesh screen, superior results are obtained when the activation is carried out in the temperature range of approximately 190–250° C. and below the ultimate decomposition temperature of the particular alkylaluminum used.

*Example 9*

The procedure of Example 1 is repeated substituting for the tri-isobutylaluminum there used an equal weight of triethylaluminum. Substantially similar results are obtained.

*Example 10*

The procedure of Example 1 is repeated substituting for the tri-isobutylaluminum there used an equal weight of tripropylaluminum. Substantially similar results are obtained.

*Example 11*

The procedure of Example 1 is repeated substituting for the tri-isobutylaluminum there used an equal weight of trioctylaluminum. Substantially similar results are obtained.

*Example 12*

The procedure of Example 1 is repeated substituting for the tri-isobutylaluminum there used an equal weight of tridecylaluminum. Substantially similar results are obtained.

*Example 13*

The procedure of Example 1 is repeated substituting for the tri-isobutylaluminum there used an equal weight of diethylaluminum hydride. Substantially similar results are obtained.

*Example 14*

The procedure of Example 1 is repeated substituting for the tri-isobutylaluminum there used an equal weight of dipropylaluminum hydride. Substantially similar results are obtained.

*Example 15*

The procedure of Example 1 is repeated substituting for the tri-isobutylaluminum there used an equal weight of di-isobutylaluminum hydride. Substantially similar results are obtained.

*Example 16*

The procedure of Example 1 is repeated substituting for the tri-isobutylaluminum there used an equal weight of dioctylaluminum hydride. Substantially similar results are obtained.

*Example 17*

The procedure of Example 1 is repeated substituting for the tri-isobutylaluminum here used an equal weight of didecylaluminum hydride. Substantially similar results are obtained.

Example 18

The procedure of Example 1 is repeated substituting for the tri-isobutylaluminum there used an equal weight of mono-ethylaluminum hydride. Substantially similar results are obtained.

Example 19

The procedure of Example 1 is repeated substituting for the tri-isobutylaluminum there used an equal weight of mono-propylaluminum hydride. Substantially similar results are obtained.

Example 20

The procedure of Example 1 is repeated substituting for the tri-isobutylaluminum there used an equal weight of mono-isobutylaluminum hydride. Substantially similar results are obtained.

Example 21

The procedure of Example 1 is repeated substituting for the tri-isobutylaluminum there used an equal weight of mono-octylaluminum hydride. Substantially similar results are obtained.

Example 22

The procedure of Example 1 is repeated substituting for the tri-isobutylaluminum there used an equal weight of monodecylaluminum hydride. Substantially similar results are obtained.

The foregoing examples illustrate embodiments of the present invention utilizing an "activator" principally in the presence of hydrogen although it will be realized that this is not absolutely essential.

The examples further illustrate the utilization of an inert organic liquid, such as heptane, as a medium in which to carry out the activation. It is to be noted that any inert organic liquid, preferably one not susceptible to undergoing hydrogenation, can be utilized in place of the heptane. Suitable inert organic compounds are such as, for example, pentane, cyclopentane, hexane, cyclohexane, heptane, cycloheptane, octane, nonane, decane, decahydronaphthalene and the like.

While the foregoing description of the invention contains a limited number of specific embodiments thereof, it is to be noted that the invention is limited only by the scope of the appended claims.

What is claimed is:

1. A process of activation of aluminum useful in the preparation of organic compounds comprising heating inactive aluminum in the presence of hydrogen and a compound having the formula $R_2AlY$, in which R is chosen from the class consisting of hydrogen and alkyl and aryl radicals; and Y is chosen from the class consisting of alkyl and aryl radicals at a temperature of at least about 150° C. and below the ultimate decomposition of said compound having the formula $R_2AlY$.

2. The process of claim 1 in which the compound $R_2AlY$ is a trialkylaluminum.

3. The process of claim 2 in which the tri-alkylaluminum it tri-ethylaluminum.

4. The process of claim 2 in which the trialkylaluminum is tripropylaluminum.

5. The process of claim 2 in which the trialkylaluminum is tri-isobutylaluminum.

6. The process of claim 2 in which the trialkylaluminum is trioctylaluminum.

7. The process of claim 2 in which the trialkylaluminum is tridecylaluminum.

8. The process of claim 1 in which the compound having the formula $R_2AlY$ is a dialkylaluminum hydride.

9. The process of claim 8 in which the dialkylaluminum hydride is diethylaluminum hydride.

10. The process of claim 8 in which the dialkylaluminum hydride is dipropylaluminum hydride.

11. The process of claim 8 in which the dialkylaluminum hydride is di-isobutylaluminum hydride.

12. The process of claim 8 in which the dialkylaluminum hydride is dioctylaluminum hydride.

13. The process of claim 8 in which the dialkylaluminum hydride is didecylaluminum hydride.

14. The process of claim 1 in which the compound $R_2AlY$ is a monoalkylaluminum hydride.

15. The process of claim 14 in which the monoalkylaluminum hydride is monoethylaluminum hydride.

16. The process of claim 14 in which the monoalkylaluminum hydride is monopropylaluminum hydride.

17. The process of claim 14 in which the monoalkylaluminum hydride is monoisobutylaluminum hydride.

18. The process of claim 14 in which the monoalkylaluminum hydride is mono-octylaluminum hydride.

19. A process for the activation of aluminum useful in the preparation of organic compounds comprising heating inactive aluminum in the presence of both hydrogen and a compound having the formula $R_2AlY$, in which R is chosen from the class consisting of hydrogen and alkyl and aryl radicals and Y is chosen from the class consisting of alkyl and aryl radicals at a temperature of at least about 150° centigrade and below the ultimate decomposition temperature of said compound having the formula $R_2AlY$.

References Cited in the file of this patent

UNITED STATES PATENTS

| | | |
|---|---|---|
| 2,271,956 | Ruthruff | Feb. 3, 1942 |
| 2,388,428 | Mavity | Nov. 6, 1945 |
| 2,691,668 | Ziegler et al. | Oct. 12, 1954 |
| 2,787,626 | Redman | Apr. 2, 1957 |

FOREIGN PATENTS

| | | |
|---|---|---|
| 535,235 | Belgium | Feb. 15, 1955 |

OTHER REFERENCES

"Journal of Organic Chemistry," vol. 5, No. 2, March 1940, pages 106–121.

Notice of Adverse Decision in Interference

In Interference No. 91,615 involving Patent No. 2,908,562, E. H. Dobratz, Activation of aluminum, final judgment adverse to the patentee was rendered Sept. 15, 1964, as to claims 1, 2, 3, 4, 5, 8, 9, 10, 11, 14, 15, 16, 17 and 19.
[*Official Gazette January 19, 1965.*]